(12) United States Patent
Mueller et al.

(10) Patent No.: US 10,212,748 B2
(45) Date of Patent: Feb. 19, 2019

(54) RADIO CHANNEL ACCESS ON BOARD AIRCRAFT

(71) Applicant: Airbus Operations GmbH, Hamburg (DE)

(72) Inventors: Jan Mueller, Hamburg (DE); Thomas Meyerhoff, Hamburg (DE)

(73) Assignee: AIRBUS OPERATIONS GMBH, Kreetslag (DE)

(*) Notice: Subject to any disclaimer, the term of this patent is extended or adjusted under 35 U.S.C. 154(b) by 75 days.

(21) Appl. No.: 14/806,837

(22) Filed: Jul. 23, 2015

(65) Prior Publication Data

US 2016/0029409 A1    Jan. 28, 2016

(30) Foreign Application Priority Data

Jul. 25, 2014 (EP) ..................................... 14178527

(51) Int. Cl.

| | |
|---|---|
| *H04W 76/15* | (2018.01) |
| *H04W 72/04* | (2009.01) |
| *H04W 76/02* | (2009.01) |
| *H04B 7/06* | (2006.01) |
| *H04W 74/00* | (2009.01) |
| *H04W 84/22* | (2009.01) |
| *H04W 84/06* | (2009.01) |

(52) U.S. Cl.
CPC ......... *H04W 76/15* (2018.02); *H04W 72/044* (2013.01); *H04W 76/025* (2013.01); *H04B 7/0613* (2013.01); *H04W 74/00* (2013.01); *H04W 84/06* (2013.01); *H04W 84/22* (2013.01)

(58) Field of Classification Search
None
See application file for complete search history.

(56) References Cited

U.S. PATENT DOCUMENTS

| | | | | |
|---|---|---|---|---|
| 2009/0256644 | A1* | 10/2009 | Knudsen ............... | H04B 1/0458 333/32 |
| 2009/0274059 | A1* | 11/2009 | Xing .................... | H04B 7/0613 370/252 |
| 2010/0085884 | A1* | 4/2010 | Srinivasan ............ | H04W 16/08 370/252 |
| 2011/0134848 | A1* | 6/2011 | Tamaki ................ | H04B 7/0417 370/328 |
| 2013/0235746 | A1* | 9/2013 | Patel .................. | H04W 72/0453 370/252 |

* cited by examiner

*Primary Examiner* — Yaotang Wang
(74) *Attorney, Agent, or Firm* — Lorenz & Kopf LLP

(57) ABSTRACT

This relates to wireless communication on-board aircraft. More particularly, the present disclosure relates to a method for controlling an on-board aircraft network cell to be used in an on-board aircraft wireless communication network, to such an on-board aircraft network cell configured to be used in an on-board aircraft wireless communication network, to an on-board aircraft wireless communication network comprising at least one such on-board aircraft network cell, and to an aircraft comprising such on-board aircraft wireless communication network. An embodiment of the on-board aircraft network cell comprises at least one Wireless Module unit, at least two Wireless Data Concentrator units, and at least two independent wireless links, each wireless link being established between the at least one Wireless Module unit and one of the at least two Wireless Data Concentrator units.

14 Claims, 4 Drawing Sheets

RADIO CHANNEL ACCESS ON BOARD AIRCRAFT

CROSS-REFERENCE TO RELATED APPLICATIONS

This application claims priority to European Patent Application No. 14 178 527.9, filed Jul. 25, 2014 which is incorporated herein by reference in its entirety.

BACKGROUND

The embodiments described herein generally relate to wireless communications on-board aircraft. More particularly, they relate to a method for controlling an on-board aircraft network cell to be used in an on-board aircraft wireless communication network, to such an on-board aircraft network cell to be used in an on-board aircraft wireless communication network, to an on-board aircraft wireless communication network comprising at least one such on-board aircraft network cell, and to an aircraft comprising such on-board aircraft wireless communication network.

Reliable radio access techniques for packet switching wireless communication networks are well specified in standards, such as IEEE (Institute of Electrical and Electronics Engineers) 802.15.4, WirelessHART (Wireless Highway Addressable Remote Transducer Protocol) protocol or ISA (International Society of Automation) 100.11a.

For instance, IEEE 802.15.4 relates to the physical layer and media access control for low-rate wireless personal area networks (LR-WPANs), or the WirelessHART protocol pertains to a time synchronized, self-organizing, and self-healing mesh architecture. The protocol may support operation in the 2.4 GHz Industrial, Scientific and Medical (ISM) band using e.g. IEEE 802.15.4 standard radios. Finally, ISA 100.11a pertains to Wireless Systems for Industrial Automation, in particular to Process Control and Related Applications.

However, none of the above-cited techniques considers redundancy in space, time and/or frequency, especially in order to increase the reliability of wireless communication networks on-board aircraft to meet airworthiness standards.

Accordingly, there is a need for a reliable and robust radio channel access technique on-board aircraft.

In a first embodiment, a method for controlling an on-board aircraft network cell is provided. The on-board aircraft network cell is configured to be used in an on-board aircraft wireless communication network. The on-board aircraft network cell comprises at least one Wireless Module (WM) unit and at least two Wireless Data Concentrator (WDC) units. The method comprises establishing at least two independent wireless links, each between the at least one WM unit and one of the at least two WDC units.

The at least two WDC units may be spatially separated. In this respect, the at least two WDC units may also be referred to as at least two spatially separated WDC units. The on-board aircraft wireless communication network may comprise two or more of such on-board aircraft network cells, e.g., a plurality of such on-board aircraft network cells. In accordance therewith, the method may equally be performed in an on-board aircraft network comprising at least one such on-board aircraft network cell.

The on-board aircraft network cell comprising at least two spatially separated WDC units, allows a WM unit inside such cell to communicate with the at least two WDC units (and thereby with an on-board server connected thereto) via two or more wireless links (also called communication links), one link for each WDC unit inside the cell. A WM/WDC may only use one of these wireless links at a time, e.g., for wireless transmission of a data packet from the WM to the WDC or vice versa. Alternatively, for multicast transmissions, a WM/WDC may use two or more of these wireless links at a time, as will be described in more detail below. Independent of the number of wireless links used, a wireless link may be associated with a WM unit, a WDC unit (space), a specific time slot (time), a radio channel (frequency) and a transmission direction as will be described in more detail below.

The method may comprise organizing channel access of at least one of the at least one WM unit and the at least two WDC units to one or more of the at least two wireless links inside the on-board aircraft network cell or in each of two or more on-board aircraft network cells. An on-board aircraft network cell may contain multiple, e.g., hundreds, of WM units. The WM units and/or the WDC units may have specific communication demands. Further, an on-board server unit connected to the WDC units may have specific communication demands. By organising (or coordinating) the (radio) channel access of the at least one WM unit and the at least two WDC units inside a cell, collisions on the (radio) channel can be avoided, and/or communications reliability and robustness can be increased. The (radio) channel access may be organized in space, time and/or frequency (i.e., up to three dimensions).

The method may comprise scheduling channel access of at least one of the at least one WM unit and the at least two WDC units to one or more of the at least two wireless links. Scheduling may be understood as the organisation of the channel access by assigning the available at least two wireless links to the available resources in time, frequency and/or space by means of one or more of the multiple access and diversity techniques described below. The above-mentioned organization of the (radio) channel in space, time and/or frequency may be used by scheduling the wireless links, which represent a (packet) transmission, by assigning the right attributes. In short, the organization of the (radio) channel in space, time and/or frequency may be understood as or may be performed (carried out) by scheduling transmissions on the wireless links. A schedule created by the scheduling may use a wireless link several times on different time slots to coordinate packet transmission between a WM unit and a WDC unit in order to fulfil specific communications demands.

The scheduling may comprise selectively using one or more of Time Division Multiple Access (TDMA), Frequency Division Multiple Access (FDMA) and Space Division Multiple Access (SDMA) techniques for channel access of at least one of the at least one WM unit and the at least two WDC units to one or more of the at least two wireless links. These techniques used to organize the access to the (radio) channel (or to schedule access to the channel) for a manifold of users are called multiple access techniques. TDMA may organize the (radio) channel of multiple users in time. For example, using TDMA, a first WM unit can be scheduled to transmit in a first time slot to a first WDC unit, a second WM unit can be scheduled to transmit in a second time slot to a second WDC unit, and the first WM unit can be scheduled to transmit in a third time slot to the first WDC unit. The scheduled transmissions in TDMA do not necessarily have to be on the same (radio) channel. FDMA may organize the (radio) channel access of multiple users in frequency. For example, a first WM unit may be scheduled to transmit on a first channel in a first time slot to a first WDC unit, and a second WM unit may be scheduled to transmit on a second channel in the first time slot to a second WDC unit. SDMA may organize the radio channel access in space. For example, a first WM unit may be scheduled to transmit on a first channel in a first time slot to a first WDC unit, and a second WM unit may be scheduled to transmit on the first channel in the first time slot to a second WDC unit on a different wireless link, if mutual interference between the transmissions is acceptable. Combination of two or more multiple access techniques is possible.

The method may comprise selectively using one or more of spatial diversity, frequency diversity and time diversity techniques for channel access of at least one of the at least one WM unit and the at least two WDC units to one or more of the at least two wireless links.

As stated above, multiple access techniques may be used to organize the (radio) channel access of multiple users. Diversity techniques may be used to increase the communication robustness/reliability between a signaling WM unit and an on-board server unit being connected to the at least two WDC units. Diversity may be established by using multiple access techniques. By using spatial diversity, a first WM unit may be scheduled to transmit the same information to different WDC units (e.g., different spatial locations) at the same time via different communication links (this can be also referred to as Multicast) or at different times. In the latter case, a first WM unit may be scheduled to transmit a packet, via a wireless link, to a first WDC unit in a first time slot on a first channel, and then the first WM unit may transmit the same packet, via a different wireless link, to a second WDC unit in a second time slot on the first channel. Spatial diversity can be used to counteract the spatial blockage of the radio channel. By means of frequency diversity, a first WM unit may transmit the same information on different channels. This may happen at different times. For example, a first WM unit may be scheduled to transmit a packet, via a wireless link, to a first WDC unit in a first time slot on a first channel. Then, the first WM unit may transmit the same packet, via the same wireless link, to the first WDC unit in the second time slot on a second channel. Frequency diversity counteracts bad conditions on a single radio channel, e.g., on the first channel. By way of time diversity, a first WM unit may transmit the same information in different time slots. For example, a first WM unit may be scheduled to transmit a packet, via a wireless link, to a first WDC unit in a first time slot on a first channel. Then, the first WM unit may transmit the same packet, via the same wireless link, to the first WDC unit in a third time slot on the first channel. Time diversity counteracts the temporary blockage of e.g. a communication link. A combination of two or more diversity techniques is possible.

The method may comprise selectively combining two or more of TDMA, FDMA, SDMA, spatial diversity, frequency diversity and time diversity techniques for channel access of at least one of the at least one WM unit and the at least two WDC units to one or more of the at least two wireless links. The specific network cell topology as mentioned above, i.e., multiple WDC units per WM unit, enables the combined usage of TDMA, FDMA, and SDMA to organize the (radio) channel access. Additionally or alternatively, due to the specific network cell topology as mentioned above, it is possible to combine spatial, frequency and time diversity techniques, for example by using a combination of TDMA, FDMA and SDMA techniques, to increase communication robustness/reliability. The combined usage of two or more multiple access and/or diversity techniques can be ensured by appropriate scheduling of the (radio) channel access as explained above.

The method may comprise developing a schedule for scheduling channel access of at least one of the at least one WM unit and the at least two WDC units to one or more of the at least two wireless links based on requirements on data rate, delay time, quality of service (QoS), reliability and/or robustness demanded by on-board aircraft components operating the at least one WM unit. For example, the requirements on data rate, delay time, QoS, reliability and/or robustness demanded by the on-board aircraft components may be determined or acquired and the schedule may be determined in accordance therewith. The schedule may be considered to describe the channel access on the at least two wireless links by means of one or more of the above-mentioned multiple access and diversity techniques. The schedule may be derived by a self-organizing, distributed or centralized algorithm. The schedule may be dynamically changed.

According to a second embodiment, a computer program may be provided. The computer program may be stored on at least one of the at least one WM unit, the at least two WDC units and any other suitable device such as the on-board server unit. The computer program comprises program code portions for carrying out one or more of the aspects described herein, when the computer program is run or executed on a computing device such as a microprocessor, a microcontroller or a digital signal processor (DSP) or the like.

In a third embodiment, an on-board aircraft network cell is provided. The on-board aircraft network cell is configured to be used in an on-board aircraft wireless communication network. The on-board aircraft network cell comprises at least one Wireless Module (WM) unit, at least two Wireless Data Concentrator (WDC) units, and at least two independent wireless links. Each wireless link is established between the at least one WM unit and one of the at least two WDC units.

The on-board aircraft network cell may also be referred to as a network cell on-board an aircraft. Likewise, the on-board aircraft wireless communication network may also be referred to as a wireless communication network on-board an aircraft. In telecommunication, the term wireless data concentrator, or in short just concentrator, may be understood as a device that provides one or more WMs with access to a wired onboard-network.

The at least one WM unit may be, for example, any conceivable network element that can be arranged in or can be integrated into the on-board aircraft wireless communication network. The at least one WM unit may be configured to exchange information with other WM units of the on-board aircraft wireless communication network via one or more WDCs. For instance, in principle all sensors and/or actuators conventionally linked up by wire-bound communication can also be integrated in wireless manner into the on-board aircraft wireless communication network as WM units or can be linked up to the associated systems (such as WDC units). As examples of such WM units, temperature sensors, pressure sensors, proximity switches, speed sensors, airflow meters, position-measuring devices, indicating elements, electric motors, lamps and illumination systems may be mentioned.

The at least two WDC units may be in wireless communication with the at least one WM unit. For example, the at least two WDC units may be in wireless communication with two or more WM units. The at least two WDC units may be respectively configured in such a way that they are in communication with all WM units that are located in its coverage zone. This coverage zone may also be referred to as the on-board aircraft network cell mentioned above. The WDC units may be arranged at different places in the on-board aircraft wireless communication network.

By providing at least two WDC units in the on-board aircraft network cell for the at least one WM unit, thereby providing at least two independent wireless links for communication with an onboard-server such as an avionics server, wireless communication capacity, reliability and robustness of (organization of) radio channel access inside the on-board aircraft wireless communication network (wireless communication network on-board the aircraft) may be increased.

If, in the below, it is stated that the on-board aircraft network cell or, in short, the network cell, is configured to perform or carry out certain method steps or procedures, this may imply that at least one of the (i) at least one WM unit, (ii) the at least two WDC units, and (iii) one or more further units such as a server unit or other control unit may be configured to perform or carry out such method steps or procedures.

By providing at least two WDC units in the on-board aircraft network cell for the at least one WM unit, thereby providing at least two wireless links for communication with an onboard-server such das an avionics server, multiple access techniques may selectively be used alone or in combination for channel access of at least one of the at least one WM unit and the at least two WDC units to one or more of the at least two wireless links. Such multiple access techniques may comprise TDMA, FDMA and SDMA techniques.

As stated above, TDMA techniques may be used in the on-board aircraft network cell for scheduling transmissions via the at least two wireless links. In accordance therewith, time may be partitioned into time slots. Such time slots can be accessed for transmission. The network cell may further be configured to schedule one of the time slots per each wireless link (each wireless link of the at least two wireless links). The network cell may be configured to partition the time slots so as to each have the same time length or to have mutually different time lengths.

As stated above, FDMA techniques may be used in the on-board aircraft network cell for scheduling transmissions via the at least two wireless links. If FDMA techniques are used, the network cell may be configured to partition an available frequency range into a predetermined number of independent channels for transmission. The network cell may further be configured to tune the respective WDC unit and respective WM unit assigned to the wireless link to the same channel. The size of the channels may be fixed.

As stated above, SDMA techniques may be used in the on-board aircraft network cell for scheduling transmissions via the at least two wireless links. In that case, the network cell may be configured to simultaneously use the at least two wireless links for data transmission. For example, the at least one WM unit may be configured to simultaneously transmit data to the at least two WDC units via the at least two wireless links assigned to the at least one WM unit. Alternatively or additionally, the at least two WDC units may be configured to simultaneously transmit or to transmit data at different times to two or more WM units via the at least two wireless links assigned to the respective WM units.

One or more diversity techniques may be used in the on-board aircraft cell. As stated above, such diversity techniques may comprise time diversity, frequency diversity, and spatial diversity. Alternatively or additionally, frequency hopping techniques may be used, e.g., by (rapidly) switching a carrier among two or more, e.g., several, frequency channels. In the case that one or more diversity techniques are used, wireless communication capacity, reliability and robustness of (organization of) the radio channel access inside the on-board aircraft wireless communication network on-board the aircraft may be increased even further. If time diversity involves TDMA techniques, all advantages of time diversity may be exploited, such as little resource allocation due to time sharing. If frequency diversity involves at least one of FDMA and frequency hopping techniques, all advantages of frequency multiplexing can be exploited, such as simultaneous transmission in different bands (channels) or quick/flexible tunability between channels. If spatial diversity involves SDMA techniques, all advantages of true redundancy may be exploited, such as fail-safe redundancy due to the doubled WDC units, true simultaneous transmission, separation of uplink/downlink etc.

Each of the at least two wireless links may comprise a link number to uniquely identify the wireless link connection between one WM unit of the at least one WM unit and one WDC unit of the at least two WDC units. By assigning link numbers to the at least two wireless links, it is possible to schedule channel access in the on-board aircraft network cell described above by means of one or more of the above-mentioned multiple access and diversity techniques. Alternatively or additionally, each of the at least two wireless links may comprise a link direction. The link direction may be one of a downlink (DL) for transmission from one WDC unit of the at least one two WDC units to one WM unit of the at least one WM unit, and an uplink (UL) for transmission from one WM unit of the at least one WM unit to one WDC unit of the at least two WDC units. By assigning link directions to the at least two wireless links, it is possible to schedule channel access in the on-board aircraft network cell described above by means of one or more of the above-mentioned multiple access and diversity techniques. Alternatively or additionally, each wireless link may further comprise a transmission slot indicator to indicate the time slot at which the wireless link is scheduled and/or a transmission channel indicator to indicate the channel to which the one WDC unit and the one WM unit have to tune to. By assigning transmission slot indicators to the at least two wireless links, it is possible to schedule channel access in the on-board aircraft network cell described above by means of one or more of the above-mentioned multiple access and diversity techniques. It is to be noted that all of the aforementioned information (link number, link direction, transmission slot indicator and/or transmission channel indicator) may be assigned by one or more entities responsible for scheduling or organising the radio channel access. For example, such entity may be the at least one WM unit, the at least two WDC units, and/or a further entity of the wireless communication network such as a server unit or other control unit. In accordance therewith, each link can be attributed by the scheduling process with all information necessary to ascertain a well-working network.

The WDC units may be configured to serve as a bridge between the at least one WM unit and a wired on-board aircraft network. The wired on-board aircraft network may be connected to a server unit provided on-board the aircraft such as an avionics server. In this way, a reliable and robust connection to an on-board server unit such as the avionics server can be provided. The server unit may provide flight related control and cabin system functionality, for example.

In a fourth embodiment, an on-board aircraft wireless communication network is provided. The on-board aircraft wireless communication network comprises at least one on-board aircraft network cell as described herein. The on-board aircraft wireless communication network may comprise a plurality of on-board aircraft network cells as described herein. The on-board aircraft wireless communication network may be connected to a wired on-board aircraft network. In this way, for each of the at least one WM unit, at least two wireless links may be available for communication with an on-board server unit such as the avionics server.

The specific network topology, i.e., at least one on-board aircraft network cell comprising at least two spatially separated WDC units, allows a WM unit inside such a cell to communicate with the on-board server such as an avionics server via two or more wireless links (that may also be referred to as wireless communication links), one link for each WDC unit inside the cell.

It is conceivable that a WM/WDC unit can only use one of these wireless links at a time for wireless transmission of a data packet from the WM unit to the WDC unit or vice versa, except for multicast transmissions. A communication link may be considered to be associated with a WM unit, a WDC unit (space), a specific time slot (time), a radio channel (frequency) and a transmission direction.

In a fifth embodiment, an aircraft is provided. The aircraft comprises an on-board aircraft wireless communication network as described herein. The aircraft may further comprise a wired on-board aircraft network. The wired on-board aircraft network may be connected to a server unit provided on-board the aircraft such as an avionics server.

Still further, it is to be noted that the method aspects may also be embodied on at least one of the at least one WM unit, the at least two WDC units and any other suitable device comprising at least one processor and/or appropriate components for carrying out any one of the method steps. Thus, even if some of the above aspects are described herein with respect to the at least one WM unit or the at least two WDC units, these aspects may also be embodied in the on-board aircraft wireless communication network and/or the aircraft, or may be implemented as a method or as a computer program for performing or executing the method. Likewise, aspects described as or with reference to a method may be realized by suitable units (even if not explicitly mentioned) in the at least one WM unit, the at least two WDC units and/or any other suitable device, or by means of the computer program. All of the above described aspects may be implemented by hardware circuitry and/or by software.

BRIEF DESCRIPTION OF THE DRAWINGS

The various embodiments will hereinafter be described in conjunction with the following drawing figures, wherein like numerals denote like elements, and.

DETAILED DESCRIPTION

Figure 1:
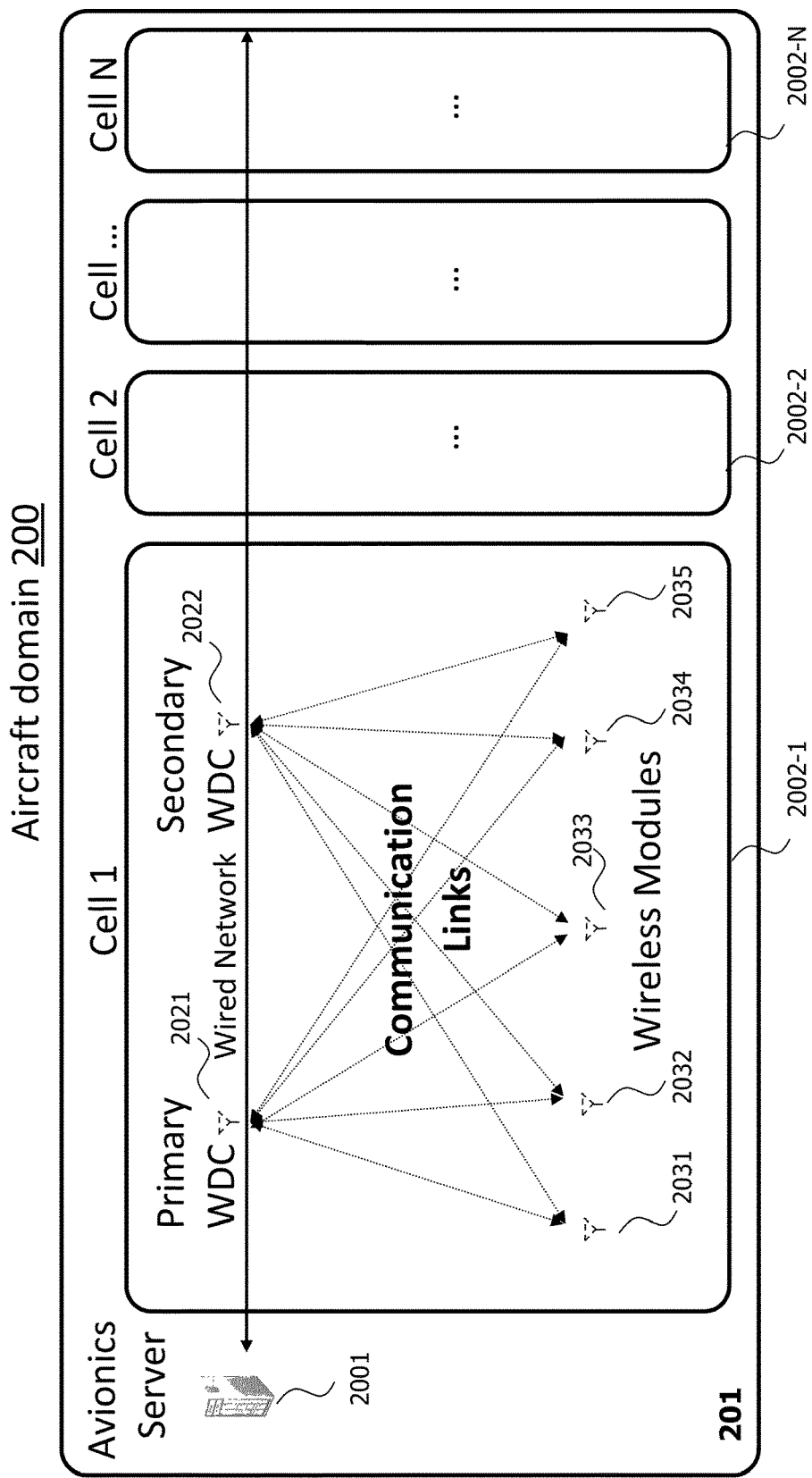
FIG. 1 shows an example arrangement of a centralized network with N extended network cells according to the present disclosure.

The following detailed description is merely exemplary in nature and is not intended to limit the disclosed embodiments or the application and uses thereof. Furthermore, there is no intention to be bound by any theory presented in the preceding background detailed description.

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. Even if in the below the present disclosure is described only with respect to specific time slots or frequency channels, the disclosure may equally be practiced by using other time slots and/or frequency channels. Further, even if in the below the present disclosure is described only with respect to Wireless Modules in general, the disclosure may equally be practiced in any other environment having specific kinds of Wireless Modules such as specific sensors and/or actuators. In principle, all sensors or actuators linked up by wire-bound communication can also be linked up in wireless manner to the respective associated system(s) or integrated into the on-board wireless communications network described below. By way of example, such sensors and/or actuators may comprise temperature sensors, pressure sensors, proximity switches, speed sensors, airflow meters, position-measuring devices etc.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Without loss of generality, the present disclosure may be summarized in equipping each network cell with one or more additional spatially segregated Wireless Data Concentrator (WDC) units in order to increase wireless communication capacity, reliability and robustness. Each Wireless Module (WM) is assigned to more than one WDC unit, so that the WDC units and its assigned WMs constitute a network cell. Inside such an extended network cell, each WM is assigned to two or more WDC units. Thus, each WM inside a cell is able to communicate with a central server entity via two or more independent communications links. For example, the approach of the present disclosure may be considered to reside in the combined application of Time Division Multiple Access (TDMA), time diversity, Frequency Division Multiple Access (FDMA), frequency diversity, Spatial Division Multiple Access (SDMA) and spatial diversity techniques for organization of the radio channel access inside wireless communication networks onboard aircraft with the aim to increase wireless communication capacity, reliability and robustness.

FIG. 1 shows an example arrangement of a centralized network 201 in an aircraft domain 200, the network 201 having N extended network cells 2002-1, 2002, ..., 2002-N (summarized by "2002" hereinafter) according to the present disclosure. The network utilizes radio channel access techniques and network topology aspects of wireless communication networks onboard the aircraft domain 200.

Such a network 201 may consist of multiple Wireless modules (WM) units 2031, 2032, 2033, 2034, 2035, central wireless data concentrators (WDC) units 2021, 2022 and a central server unit 2001. The WM and WDC units may both be equipped with a respective wireless communication interface (not shown). The WM unit may transmit and/or receive data packets to and/or from the central server entity 2001 e.g. via the wireless interface of a WDC unit 2021, 2022. The task of a WDC unit 2021, 2022 is to serve as a bridge between the WSN unit 2031-2035 and the wired onboard network (shown by the arrow traversing the cells 2002-1 to 2002-N and ending at the server entity 2001), which provides the connection the central server entity 2001. Consequently, each WM unit 2031-2035 should at least be within communication range of one WDC unit 2021, 2022 to be able to communicate with the central server unit 2001. In case one or more of the WM units 2031-2035 are configured as sensors, the network 201 may also be referred to as a sensor network.

According to the present disclosure, each extended network cell 2002 is equipped with two or more WDC units 2021, 2022 that are connected to the central aircraft domain 200 server by a wired network. In the given example, for each WM unit 2031-2035, two independent wireless links are available for communication with aircraft domain server. In general, more than two WDC units 2021, 2022 may be installed inside a particular network cell 2002 to increase the number of available communications links.

Figure 2:
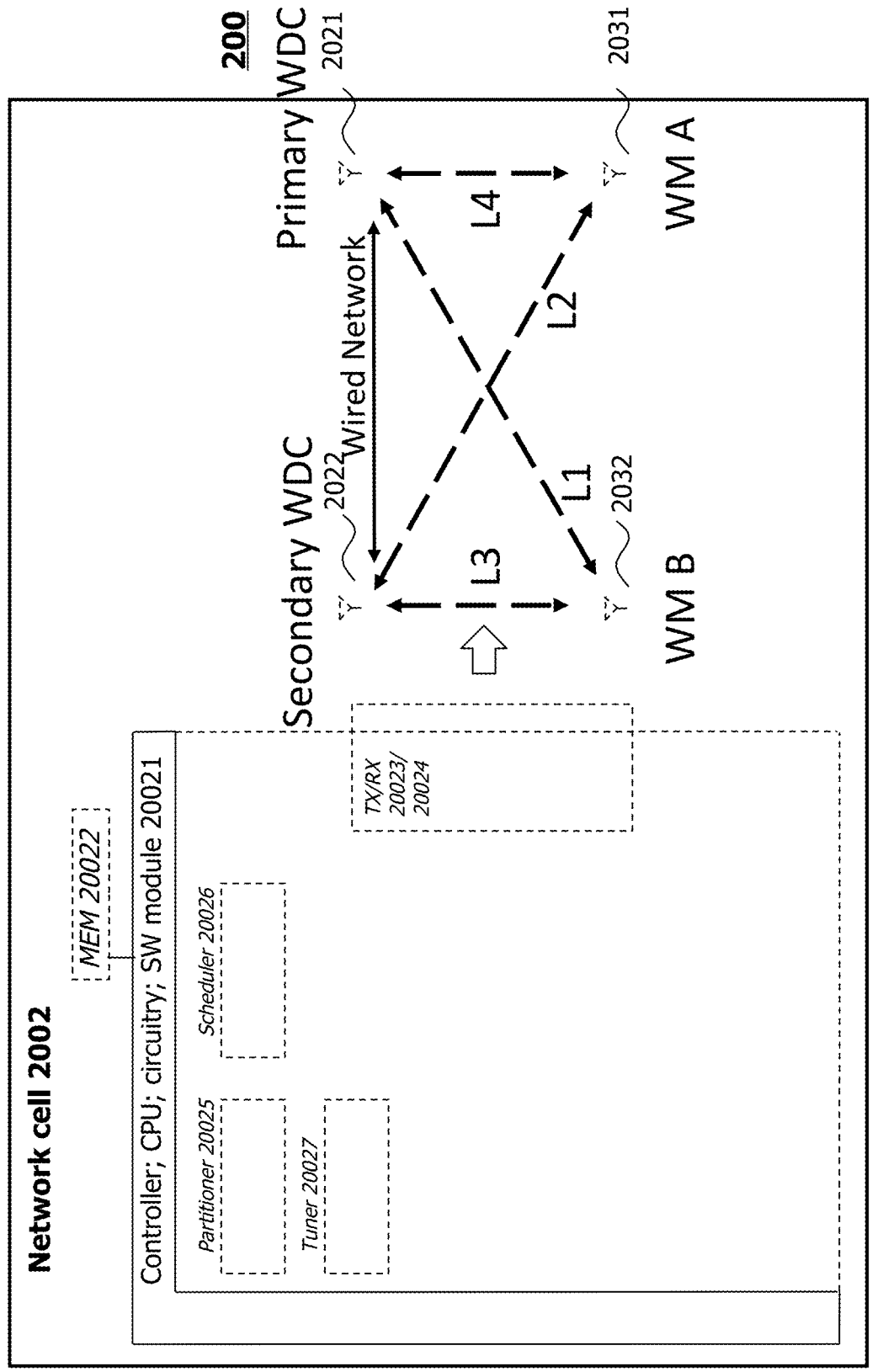
FIG. 2 shows components comprised in an exemplary device realized in the form of an on-board aircraft network cell.

FIG. 2 shows components comprised in an exemplary device embodiment realized in the form of an on-board aircraft network cell 2002. As shown in FIG. 2, the network cell 2002 (as a representative of any of the network cells 2002-1 to 2002-N) comprises a core functionality/controller (e.g., one or more of a Central Processing Unit (CPU), dedicated circuitry and/or a software module) 20021, an optional memory (and/or database) 20022, an optional transmitter 20023 and an optional receiver 20024. Moreover, the network cell 2002 comprises an optional partitioner 20025, an optional scheduler 20026 and an optional tuner 20027.

In the following paragraphs, it is assumed that x=1, 2, . . . , N (for each of the network cells 2002-1 to 2002-N). As partly indicated by the dashed extensions of the functional block of the CPUs 200x1, the partitioner 200x5, the scheduler 200x6 and the tuner 200x7 as well as the memory 200x2, the transmitter 200x3 and the receiver 200x4 may at least partially be functionalities running on the CPUs 200x1, or may alternatively be separate functional entities or means controlled by the CPUs 200x1 and supplying the same with information. The transmitter and receiver components 200x3, 200x4 may be realized to comprise suitable interfaces and/or suitable signal generation and evaluation functions.

The CPUs 200x1 may be configured, for example, using software residing in the memories 200x2, to process various data inputs and to control the functions of the memories 200x2, the transmitter 200x3 and the receiver 200x3 (as well as the partitioner 200x5, the scheduler 200x6 and the tuner 200x7). The memory 200x2 may serve for storing program code for carrying out the methods according to the aspects disclosed herein, when executed by the CPUs 200x1.

It is to be noted that the transmitter 200x3 and the receiver 200x4 may be provided as an integral transceiver, as is indicated in FIG. 2. It is further to be noted that the transmitters/receivers 200x3, 200x4 may be implemented as physical transmitters/receivers for transceiving via an air interface (such as between the WDC units 2021, 2022 and the WM units 2031-2035) or a wired connection, as routing/forwarding entities/interfaces between network elements (such as between the WDC units 2021, 2022), as functionalities for writing/reading information into/from a given memory area or as any suitable combination of the above (such as between the WDC units 2021, 2022). At least one of the above-described first partitioner 200x5, scheduler 200x6 and tuner 200x7, or the respective functionalities, may also be implemented as a chipset, module or subassembly.

Figure 3:
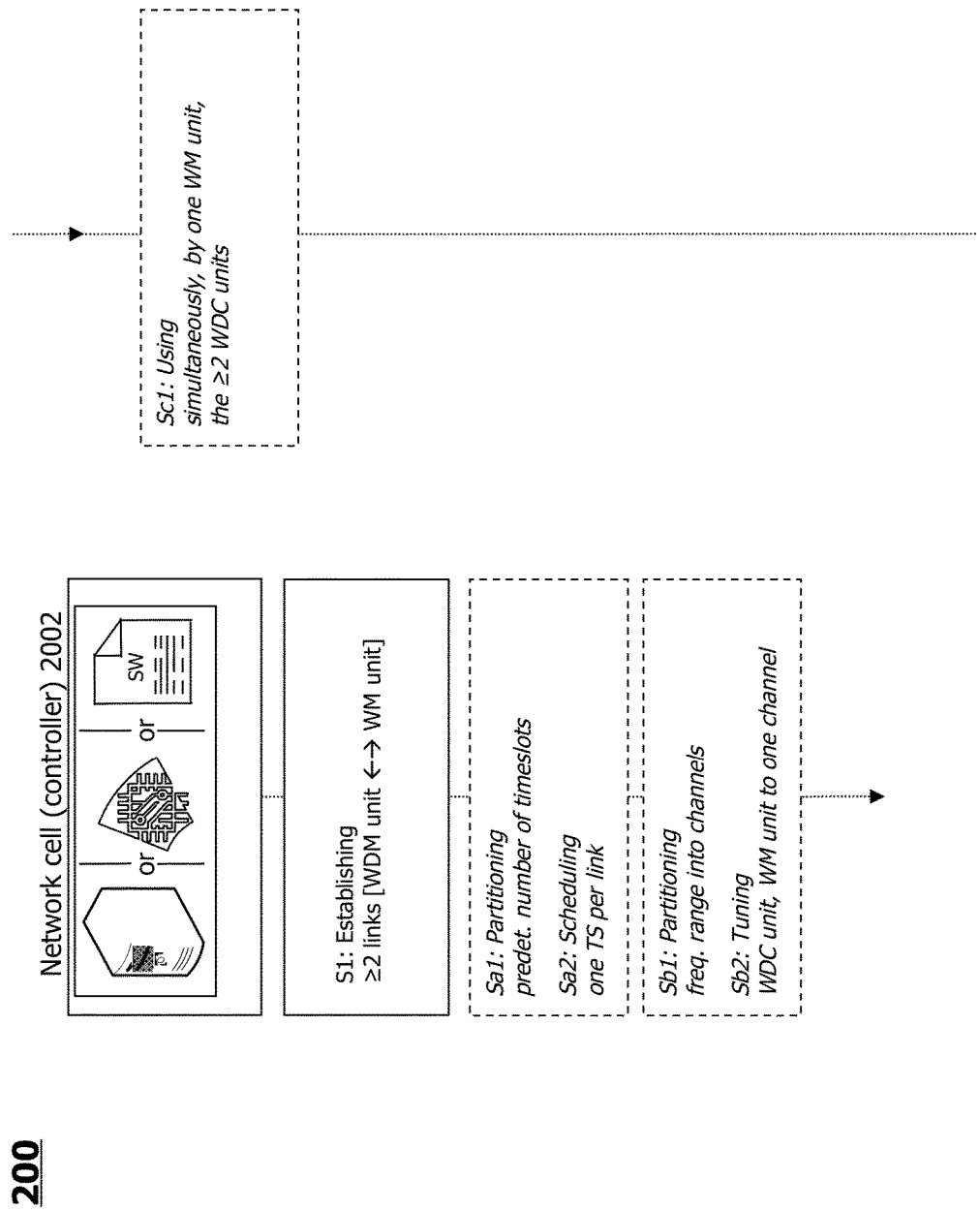
FIG. 3 shows a method that also reflects the interaction between the components of the device.

FIG. 3 shows a method embodiment that also reflects the interaction between the components of the device embodiment. In the signalling diagram of FIG. 3, time aspects between signalling are reflected in the vertical arrangement of the signalling sequence as well as in the sequence numbers. It is to be noted that the time aspects indicated in FIG. 3 do not necessarily restrict any one of the method steps shown to the step sequence outlined in FIG. 3. This applies in particular to method steps that are functionally disjunctive with each other.

Now turning to the network cell 2002, as stated above, the network cell 2002 comprises at least one Wireless Module, WM, unit 2031 to 2035 and at least two Wireless Data Concentrator, WDC, units 2021, 2022. In a step S1, the network cell 2002 (or its controller/CPU 20021) performs establishing at least two independent wireless links L1 to L4, each between the at least one WM unit 2021, 2022 and one of the at least two WDC units 2031-2035. As is best shown in FIG. 2, e.g. the WM unit 2031 ("WM A") has one link L4 to the "primary" WDC unit 2021 and one link L2 to the "secondary" WDC unit 2022.

Consequently, the at least two wireless links (e.g. L2, L4) may utilize at least one of time diversity, frequency diversity, and spatial diversity. If so, the extension (meaning providing at least two WDC units 2021, 2022) of a network cell 2002 provides the possibility to combine Time Division Multiple Access (TDMA) as a first example of time diversity, Frequency Division Multiple Access (FDMA) as a second example frequency diversity (e.g. Frequency Hopping) and Spatial Division Multiple Access (SDMA) as a third example for spatial diversity techniques in order to increase the wireless communication capacity, reliability and robustness inside the aircraft domain 200.

As for the first example, as stated above, time diversity involves TDMA. In that case, in an optional step Sa1, the network cell 2002 (or its partitioner 20025) may be configured to partition time into time slots (e.g. TS1 to TS6 shown in FIG. 4) for transmission. As an example, the time slots may be portioned to each have the same time length or to have mutually different time lengths (in other words, the time slots do not necessarily have the same size).

Still further, the network cell 2002 (or its scheduler 20026), in an optional step Sa2, performs scheduling one of the time slots per each wireless link.

As for the second example, frequency diversity involves FDMA or frequency hopping. In that case, the network cell 2002 (or its partitioner 20025), in an optional step Sb1, performs partitioning an available frequency range into a predetermined number of independent channels (e.g. CH1 to CH3 shown in FIG. 4) for transmission.

Still further, the network cell 2002 (or its tuner 20227), in an optional step Sb2, performs tuning the respective WDC unit and respective WM unit assigned to the wireless link to the same channel. For a successful communication, the respective WDC unit 2021, 2022 and the respective WM unit 2031-2035 associated to communication link should be tuned to the same frequency channel. Optionally, the size of the channels is fixed.

Finally, as for the third example, time diversity involves SDMA. In that case, the network cell 2002 (or its controller 20021) performs simultaneously using, by the at least one WM unit 2031-2035, the at least two WDC units 2021, 2022 for transmission via the links assigned to the at least one WM unit 2031-2035.

Finally, each wireless link, in order to support the organization of the radio channel access all communication links of an extended network cell shall 2002, may comprise the following attributes:

A link number to uniquely identify the wireless link connection between one WM unit 2031-2035 and one WDC unit 2021, 2022.

A link direction, which is a downlink, DL, for transmission from the one WDC unit to the one WM unit or an uplink, UL, for transmission from the one WM unit to the one WDC unit.

A transmission slot indicator to indicate the time slot at which the wireless link is scheduled.

A transmission channel indicator to indicate the channel to which the one WDC unit and the one WM unit have to tune to.

Figure 4:
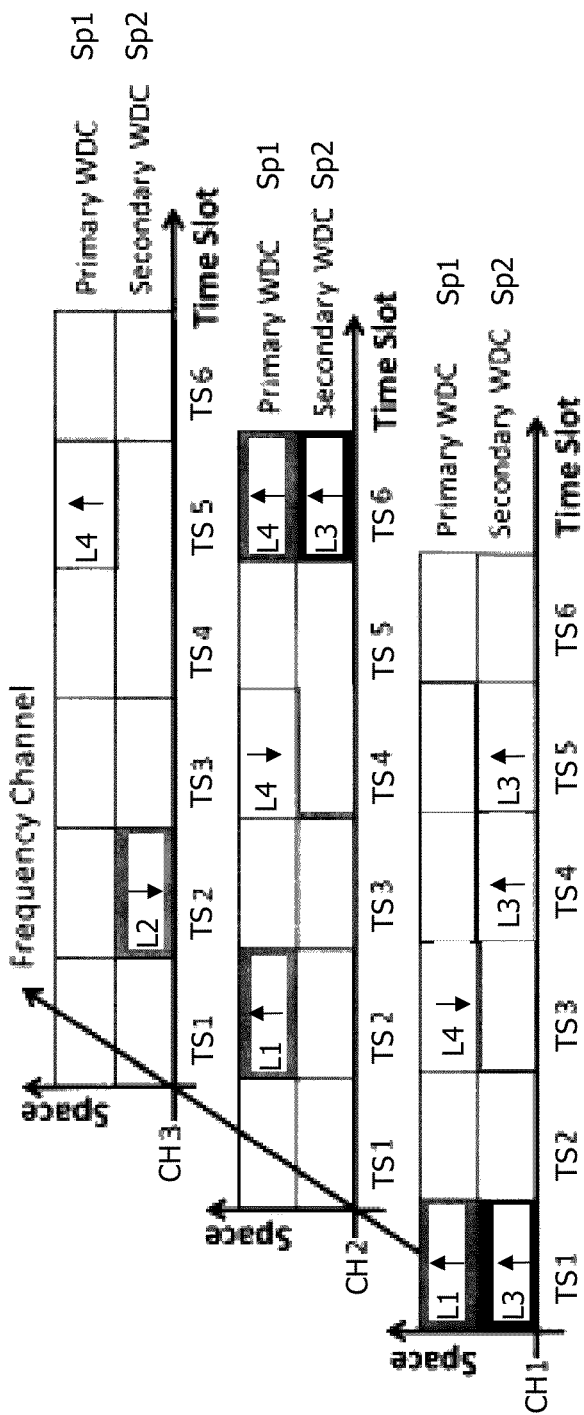
FIG. 4 exemplary shows radio channel access over time, frequency and space inside the network cell according to the present disclosure.

FIG. 4 exemplary shows radio channel access over time, frequency and space inside the network cell according to the present disclosure. In FIG. 4, a use of the network cell 2002 according to the present disclosure is shown. Each reference, such as "Lx", pertains to the link Lx shown in FIG. 2, whereas an upward arrow indicates the UL, and the downward arrow indicates the DL. Without loss of generality, the spatial diversity may be attained by using two "spaces" Sp1, Sp2, i.e. the primary/secondary WDC unit 2021, 2022, the frequency diversity may be attained by using three channels CH1 to CH3, and time diversity may be attained by using 6 time slots TS1 to TS6. However, in principle, the present disclosure covers any case in which two or more WDC units, two or more channels and/or two or more time slots are provided.

In FIG. 4, the use case for the radio channel access sequence is described as follows.

In TS1, the radio channel access may be organized such that the primary 2021 and secondary WDC units 2022 are tuned to the same frequency channel (here: CH1), when WM B unit 2032 in FIG. 2 intends to transmit a packet. Consequently, the likelihood that the transmitted packet is successfully received, and forwarded to the central aircraft domain server, is increased by spatial diversity resulting from the simultaneous usage of the independent communication links L1 and L3. As shown in FIG. 4, both communication links L1, L3 are scheduled for uplink transmission from WM B 2032 to the primary 2021 and secondary WDC units 2022. As an example, WM B unit 2032 may use (wireless) link L1 for the UL, and link L3 for the DL (or vice versa). This ensures maximum reachability for the WM B unit 2032.

In TS2, WM A unit 2031 in FIG. 2 and the secondary WDC unit 2022 are tuned to CH3, while WM B 2032 and the primary WDC unit 2021 are tuned to CH2 allowing both WDC units 2021, 2022 to simultaneously transmit or receive packets over link L2 and L1 (FDMA). In that case, both UL and DL may be handled on the same channel (see L1 and L4 in CH2); alternatively, e.g. only the UL in one channel CH3 may be handled on TS2, whereas the UL may be handled in another TS.

In TS3 to TS5, the radio channel access of WM unit A 2031 and the primary WDC unit 2021 utilizes frequency hopping to increase communication reliability by frequency diversity of link L4. As hinted at above, the UL/DL of link L4 can be accommodated in two (adjacent) time slots, e.g. TS4 and TS5.

During the same time (TS3 to TS5), the radio channel access of WM unit B 2032 and the secondary WDC unit 2022 is such that same information is transmitted by WM unit B 2032 in TS 4 and 5 to increase reliability of link L3 by time diversity. Thus, during TS3 to TS5, a combination of FDMA, frequency diversity, TDMA, time diversity is applied for radio channel access inside the extended network cell.

In TS6, an SDMA technique is applied to increase communication capacity. For this purpose, the radio channel access of the WM units 2031, 2032 and WDC units 2021, 2022 is organized such that both WM units 2031, 2032 simultaneously transmit their packets via link L4 and L3 on the same frequency channel (here: CH2). SDMA, of course, is most reasonable when the interference situation at the WDC units allows a successful reception of the packets; however, this does not preclude the usage of fail-operational/recovery techniques, such as packet re-transmission in case of a noisy environment.

In the following, the diversity techniques scheduled for the radio channel access sequence of FIG. 4 are explained below in more detail.

Spatial Diversity is exemplarily used in FIG. 4 as follows. In multicast operation, WM B unit 2032 transmits the same information to different WDC units 2021, 2022 (different spatial locations) at the same time or at different time slots via different communication links. More specifically, as shown in FIG. 4, WM B unit 2032 transmits the same information in TS 1 via L1 to the primary WDC unit 2021 and via L3 to the secondary WDC unit 2022. Spatial diversity is used to counteract the spatial blockage of the radio channel. To give another example (not shown in FIG. 4), WM A unit 2031 may transmit information in TS1 to secondary WDC unit 2022 and then WM A unit 2031 may transmit the same information to primary WDC unit 2021 in TS2.

Frequency Diversity is also exemplarily used in FIG. 4 as follows. As shown in FIG. 4, WM B unit 2032 is scheduled to transmit a packet via L1 to the primary WDC unit 2021 in TS1 on CH1. Then, WM B unit 2032 is scheduled to transmit the same packet via L1 to the primary WDC unit 2021 in TS2 on CH2. The foregoing can even be regarded as a combined frequency and time diversity approach. Frequency diversity counteracts bad conditions on a single radio channel (e.g.: CH1).

Time Diversity is also exemplarily used in FIG. 4 as follows. WM B unit 2032 is scheduled to transmit a packet via L3 to the secondary WDC unit 2022 in TS4 on CH1. Then, WM B unit 2032 is scheduled to transmit the same packet via L3 to the secondary WDC unit 2022 in TS5 on CH1. Time diversity counteracts the temporary blockage of e.g. a communication link.

The combined use of two or more, for example all, of the multiple access and/or diversity techniques as described above (with reference to FIG. 4) with respect to at least some of the multiple access and/or diversity techniques shows that organizing the radio channel access directly relates to the task of appropriately scheduling wireless communication links inside an extended network cell in time, frequency and space. The development of such a schedule, thus appropriate combination application of the multiple access and diversity techniques described above, may leverage between data rate, max. delay time, Quality of Service (QoS), reliability and robustness, on demand by the aircraft system applications operating the WM units.

The present disclosure provides one or more of the following advantages:

The combined use of two or more of TDMA, FDMA, SDMA, time diversity, frequency diversity and space diversity for organization of the radio channel access inside wireless communication networks on-board aircraft aims to increase wireless communication capacity, reliability and robustness.

The partitioning into time slots and frequency channels is utilized to support and simplify an organization of the radio channel access by allowing the association of a transmission inside an extended network cell to specific time slot and frequency channel.

It is believed that the advantages of the technique presented herein will be fully understood from the foregoing description, and it will be apparent that various changes may be made in the form, constructions and arrangement of the exemplary aspects thereof without departing from the scope of the present disclosure or without sacrificing all of its advantageous effects. Because the technique presented herein can be varied in many ways, it will be recognized that the present disclosure should be limited only by the scope of the claims that follow.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A method for controlling an on-board aircraft network cell configured to be used in an on-board aircraft wireless communication network, wherein the method comprises:
   configuring the network cell to comprise at least one Wireless Module, WM, unit and at least two Wireless Data Concentrator, WDC, units,
   establishing at least two simultaneous and independent wireless data links each between the at least one WM unit and one of the at least two WDC units,
   developing a schedule for scheduling channel access of at least one of the at least one WM unit and the at least two WDC units to one or more of the at least two wireless links based on requirements on data rate, delay time, reliability and/or robustness demanded by on-board aircraft components operating the at least one WM unit, and
   dynamically scheduling channel access of the at least one WM unit and the at least two WDC units to one or more of the at least two simultaneous and independent wireless data links by assigning the available at least two simultaneous and independent wireless data links to the available resources in time, frequency and space by means of one or more of Time Division Multiple Access, TDMA, Frequency Division Multiple Access, FDMA, and Space Division Multiple Access, SDMA.

2. The method according to claim 1, wherein the method further comprises:
   selectively using one or more of spatial diversity, frequency diversity and time diversity techniques for channel access of at least one of the at least one WM unit and the at least two WDC units to one or more of the at least two wireless links.

3. The method according to claim 1, wherein the method comprises:
   selectively combining two or more of TDMA, FDMA, SDMA, spatial diversity, frequency diversity and time diversity techniques for channel access of at least one of the at least one WM unit and the at least two WDC units to one or more of the at least two wireless links.

4. The method according to claim 1, wherein each of the at least one WM unit located in the network cell is within a communication range of each of the at least two WDC units.

5. The method according to claim 1, wherein the at least two independent wireless links comprise a primary link and at least one secondary link, the method further comprising:
   selectively using a first technique for channel access for the primary link, and
   selectively using a second technique for channel access for the at least one secondary link, and
   wherein the first technique may be different from the second technique.

6. An on-board aircraft network cell configured to be used in an on-board aircraft wireless communication network, comprising:
   at least one Wireless Module, WM, unit;
   at least two Wireless Data Concentrator, WDC, units; and
   at least two simultaneous and independent wireless data links, each wireless link being established between the at least one WM unit and one of the at least two WDC units, and wherein the onboard network cell is configured to develop a schedule for scheduling channel access of at least one of the at least one WM unit and the at least two WDC units to one or more of the at least two wireless links based on requirements on data rate, delay time, reliability and/or robustness demanded by on-board aircraft components operating the at least one WM unit, and wherein the on-board network cell is further configured to dynamically schedule channel access of the at least one WM unit and the at least two WDC units to one or more of the at least two simultaneous and independent wireless data links by assigning the available at least two simultaneous and independent wireless data links to the available resources in time, frequency and space by means of one or more of Time Division Multiple Access, TDMA, Frequency Division Multiple Access, FDMA, and Space Division Multiple Access, SDMA.

7. The network cell according to claim 6, wherein the network cell is configured to:
   partition time into time slots for transmission, and
   schedule one of the time slots per each wireless link.

8. The network cell according to claim 7, wherein the network cell is configured to partition the time slots to each have the same time length or to have mutually different time lengths.

9. The network cell according to claim 6, wherein the network cell is configured to:
   partition an available frequency range into a predetermined number of independent channels for transmission, and
   tune the respective WDC unit and respective WM unit assigned to the wireless link to the same channel.

10. The network cell according to claim 9, wherein the size of the channels is fixed.

11. The network cell according to claim 6, wherein the network cell is configured to simultaneously use the at least two wireless links for data transmission.

12. An on-board aircraft wireless communication network comprising at least one on-board aircraft network cell according to claim 6.

13. An aircraft comprising an on-board aircraft wireless communication network according to claim 12.

14. The network cell according to claim 6, wherein the at least two independent wireless links comprise a primary link and at least one secondary link, and
   wherein the network cell is configured to:
   selectively use a first technique for channel access for the primary link, and
   selectively use a second technique for channel access for the at least one secondary link, and
   wherein the first technique may be different from the second technique.

* * * * *